United States Patent
Ifrim

(10) Patent No.: US 12,516,759 B2
(45) Date of Patent: Jan. 6, 2026

(54) SCOTCH YOKE GIMBAL JOINT

(71) Applicant: THE BOEING COMPANY, Arlington, VA (US)

(72) Inventor: Alin Ifrim, Surprise, AZ (US)

(73) Assignee: The Boeing Company, Arlington, VA (US)

( * ) Notice: Subject to any disclaimer, the term of this patent is extended or adjusted under 35 U.S.C. 154(b) by 63 days.

(21) Appl. No.: 18/393,456

(22) Filed: Dec. 21, 2023

(65) Prior Publication Data

US 2025/0207699 A1 Jun. 26, 2025

(51) Int. Cl.
*F16L 27/04* (2006.01)
*B64F 1/28* (2006.01)

(52) U.S. Cl.
CPC .............. *F16L 27/04* (2013.01); *B64F 1/28* (2013.01)

(58) Field of Classification Search
CPC ......... F16L 27/04; F16L 27/11; F16L 51/025; F16L 37/107; F16L 37/248; F16B 7/0406; F16B 7/0426; F16B 7/044; F16B 7/048; F16B 7/0486
USPC ........................................................ 285/265
See application file for complete search history.

(56) References Cited

U.S. PATENT DOCUMENTS

| | | | | |
|---|---|---|---|---|
| 892,930 | A * | 7/1908 | Brown | F16L 27/04 285/94 |
| 1,165,449 | A * | 12/1915 | Reitz | F16L 27/11 74/18 |
| 11,112,040 | B2 | 9/2021 | Sparks et al. | |
| 2018/0038530 | A1 * | 2/2018 | Yeandel | F16L 27/11 |
| 2020/0088332 | A1 * | 3/2020 | Innis | F16L 27/11 |
| 2021/0180733 | A1 * | 6/2021 | Gupta | F16L 27/111 |
| 2022/0099225 | A1 * | 3/2022 | Thompson | F16L 27/11 |

FOREIGN PATENT DOCUMENTS

| | | | | |
|---|---|---|---|---|
| CN | 103883824 | A * | 6/2014 | ............. F16L 51/025 |
| CN | 109519639 | A * | 3/2019 | ............. F16L 27/11 |
| CN | 116592201 | A * | 8/2023 | ............. F16L 27/11 |
| CN | 117028728 | A * | 11/2023 | ............. F16L 27/11 |
| CN | 118375800 | A * | 7/2024 | ............. F16L 27/11 |
| DE | 4436514 | A1 * | 4/1996 | ............. F16L 51/024 |
| DE | 202010002274 | U1 * | 6/2010 | ............. F16L 27/11 |
| GB | 2552686 | A * | 2/2018 | ............. F16L 27/11 |
| GB | 2586798 | A * | 3/2021 | ............. F16B 7/044 |
| KR | 20130070323 | A * | 6/2013 | ............. F16L 27/11 |
| KR | 20180062641 | A * | 6/2018 | ............. F16L 27/11 |
| WO | WO-8202581 | A1 * | 8/1982 | ............. F16L 27/11 |

* cited by examiner

*Primary Examiner* — Matthew Troutman
*Assistant Examiner* — Fannie Kee
(74) *Attorney, Agent, or Firm* — Joseph M. Butscher; The Small Patetn Law Group LLC

(57) ABSTRACT

A gimbal joint includes a first clevis having a first arm defining a slot. The gimbal joint also includes a second clevis having a second arm. The second arm has a curved surface that engages the first arm and allows for relative rotational motion between the first and second clevises. The gimbal joint also includes a pin coupled with the second arm. The pin is slidably received within the slot of the first arm to allow for relative translational motion between the first and second clevises.

21 Claims, 7 Drawing Sheets

SCOTCH YOKE GIMBAL JOINT

FIELD

Aspects of the present disclosure relate to gimbal joints for fluid delivery applications.

BACKGROUND

Some fuel lines for delivering fuel to an aircraft engine include a gimbal expansion joint to account for pressure thrust loads and to provide a few degrees of flex. Gimbal expansion joints are designed to allow angular movement in any plane. Conventionally, overly complex gimbal expansion joints, such as those equipped with a gimbal ring, have been utilized for aircraft fuel lines, which can increase weight and cost of aircraft.

SUMMARY

The present disclosure provides a gimbal joint in one aspect. The gimbal joint includes: a first clevis having a first arm defining a slot; a second clevis having a second arm, the second arm has a curved surface that engages the first arm and allows for relative rotational motion between the first and second clevises; and a pin coupled or integrally formed with the second arm and slidably received within the slot of the first arm to allow for relative translational motion between the first and second clevises.

In one aspect, in combination with any example gimbal joint above or below, the first clevis has a third arm defining a slot and the second clevis has a fourth arm that has a curved surface that engages the third arm to allow for relative rotational motion between the first and second clevises, and wherein the gimbal joint further includes: a second pin coupled or integrally formed with the fourth arm and slidably received within the slot of the third arm to allow for relative translational motion between the first and second clevises.

In one aspect, in combination with any example gimbal joint above or below, the first arm and the second arm form a first slotted pair and the third arm and the fourth arm form a second slotted pair, and wherein the first and second slotted pairs are arranged radially opposite one another with respect to a central axis of the gimbal joint.

In one aspect, in combination with any example gimbal joint above or below, the curved surface of the second arm is a radially outer surface of the second arm that engages a radially inner surface of the first arm.

In one aspect, in combination with any example gimbal joint above or below, the radially inner surface of the first arm is a planar surface.

In one aspect, in combination with any example gimbal joint above or below, the curved surface of the second arm is a radially inner surface of the second arm that engages a radially outer surface of the first arm.

In one aspect, in combination with any example gimbal joint above or below, the second arm defines an opening in which the pin is received.

In one aspect, in combination with any example gimbal joint above or below, the first arm includes opposing tabs that define a recess in which the second arm is positioned, the opposing tabs constrain the relative rotational motion between the first and second clevises to a predetermined range.

In one aspect, in combination with any example gimbal joint above or below, the first clevis has a first rim from which the first arm extends, and the second clevis has a second rim from which the second arm extends, and wherein the gimbal further includes: a bellows that is flexibly coupled with the first rim and the second rim.

In one aspect, in combination with any example gimbal joint above or below, the curved surface of the second arm has convex curvature with respect to a surface of the first arm that engages the curved surface.

In one aspect, in combination with any example gimbal joint above or below, the slot has a length and a width, and wherein the length is at least twice the width.

In one aspect, in combination with any example gimbal joint above or below, the first arm has a first extender and a first flange connected to the first extender, the first extender angles the first arm radially outward with respect to a central axis of the gimbal joint as well as axially toward the second clevis.

In one aspect, in combination with any example gimbal joint above or below, the first flange defines the slot, and wherein the slot has a long axis that extends axially.

The present disclosure provides a gimbal joint in another aspect. The gimbal joint includes: a first clevis having a first rim, a first arm, and a third arm, the first and third arms each extend from the first rim and each define slots; a second clevis having a second rim, a second arm, and a fourth arm, the second and fourth arms each extend from the second rim, the second arm and the fourth arm each have curved surfaces that respectively engage the first arm and the third arm of the first clevis so as to allow for relative rotational motion between the first and second clevises; a bellows coupling the first rim and the second rim; a first pin coupled or integrally formed with the second arm and received within the slot of the first arm; and a second pin coupled or integrally formed with the fourth arm and received within the slot of the third arm, and wherein the first pin and the second pin are slidably received within their respective slots so as to allow for translational motion between the first and second clevises.

In one aspect, in combination with any example gimbal joint above or below, the first arm has a first extender and a first flange connected to the first extender, the first extender angles the first arm radially outward with respect to a central axis of the gimbal joint as well as axially toward the second clevis, and wherein the third arm has a third extender and a third flange connected to the third extender, the third extender angles the third arm radially outward with respect to the central axis as well as axially toward the second clevis, and wherein the first and third flanges each define one of the slots.

In one aspect, in combination with any example gimbal joint above or below, the second arm has a second extender and a second flange connected to the second extender, the second extender angles the second arm radially outward with respect to the central axis as well as axially toward the first clevis, and wherein the fourth arm has a fourth extender and a fourth flange connected to the fourth extender, the fourth extender angles the fourth arm radially outward with respect to the central axis as well as axially toward the first clevis, and wherein the second and fourth flanges each include one of the curved surfaces.

In one aspect, in combination with any example gimbal joint above or below, the first flange defines one of the slots and the third flange defines one of the slots.

In one aspect, in combination with any example gimbal joint above or below, the first pin extends from the curved surface of the second arm and the second pin extends from the curved surface of the fourth arm.

The present disclosure provides a feedline in another aspect. The feedline includes: a conduit for carrying a fluid; and a gimbal joint positioned along the conduit. The gimbal joint includes a first clevis having a first rim and a first arm extending from the first rim, the first rim is coupled with a first segment of the conduit and the first arm defines a slot; a second clevis having a second rim and a second arm extending from the second rim, the second rim is coupled with a second segment of the conduit and the second arm has a curved surface that engages the first arm and allows for relative rotational motion between the first and second clevises; a bellows coupling the first rim and the second rim; and a pin coupled or integrally formed with the second arm, the pin is slidably received within the slot of the first arm to allow for relative translational motion between the first and second clevises.

In one aspect, in combination with any example gimbal joint above or below, the feedline is a fuel line for an aircraft.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Some fuel lines, such as fuel lines for delivering fuel to an aircraft engine, typically need a few degrees of flex and an ability to isolate vibrations. To accommodate such needs, gimbal expansion joints are typically positioned along such fluid lines. Gimbal expansion joints are designed to allow angular movement in any plane and to account for pressure thrust loads. However, conventionally, overly complex gimbal expansion joints have been utilized for such fuel lines.

The present disclosure provides a gimbal joint that functions like a scotch yoke to provide angular movement in any plane as well as vibration isolation properties. In one aspect, a gimbal joint includes a pair of clevises arranged so that at least one slotted pair of flanges is provided to allow for relative translational and rotational motion between the clevises. Particularly, to form the slotted pair, a pin is slidably received in a slot defined by one of the flanges to allow for relative translational motion between the clevises. Further, at least one of the flanges has a curved surface that engages a surface of the other flange, which facilitates relative rotational motion between the clevises. A sealing bellows can be clamped internally to respective rims of the clevises. The ability of the first and second clevises to translate and rotate relative to one another allows for angular rotation of the gimbal joint in any plane. The sliding action of the pin within the slot provides vibration isolation properties in addition to translational motion. The rotating action facilitated by the curved surface provides the rotational motion. The clevises can be translated, rotated, or translated and rotated relative to one another to provide the desired "flex", e.g., along a fuel line. Advantageously, the scotch yoke gimbal joint of the present disclosure can reduce stress and complexity compared to conventional gimbal expansion joints. Such a gimbal joint can provide vibration isolation for fuel lines along with an ability to carry large axial and torsional loads. Moreover, the scotch yoke gimbal joint of the present disclosure can provide a light weight and low-cost design relative to conventional gimbal expansion joints, particularly compared to those that include a gimbal ring.

Although the inventive aspects of the present disclosure are disclosed herein in the context of a gimbal joint for fuel lines arranged to deliver fuel to an aircraft engine, the inventive aspects are applicable to other fuel lines generally, as well as to other fluid delivery applications, including fluid delivery applications in industries other than the aerospace industry.

Figure 1:
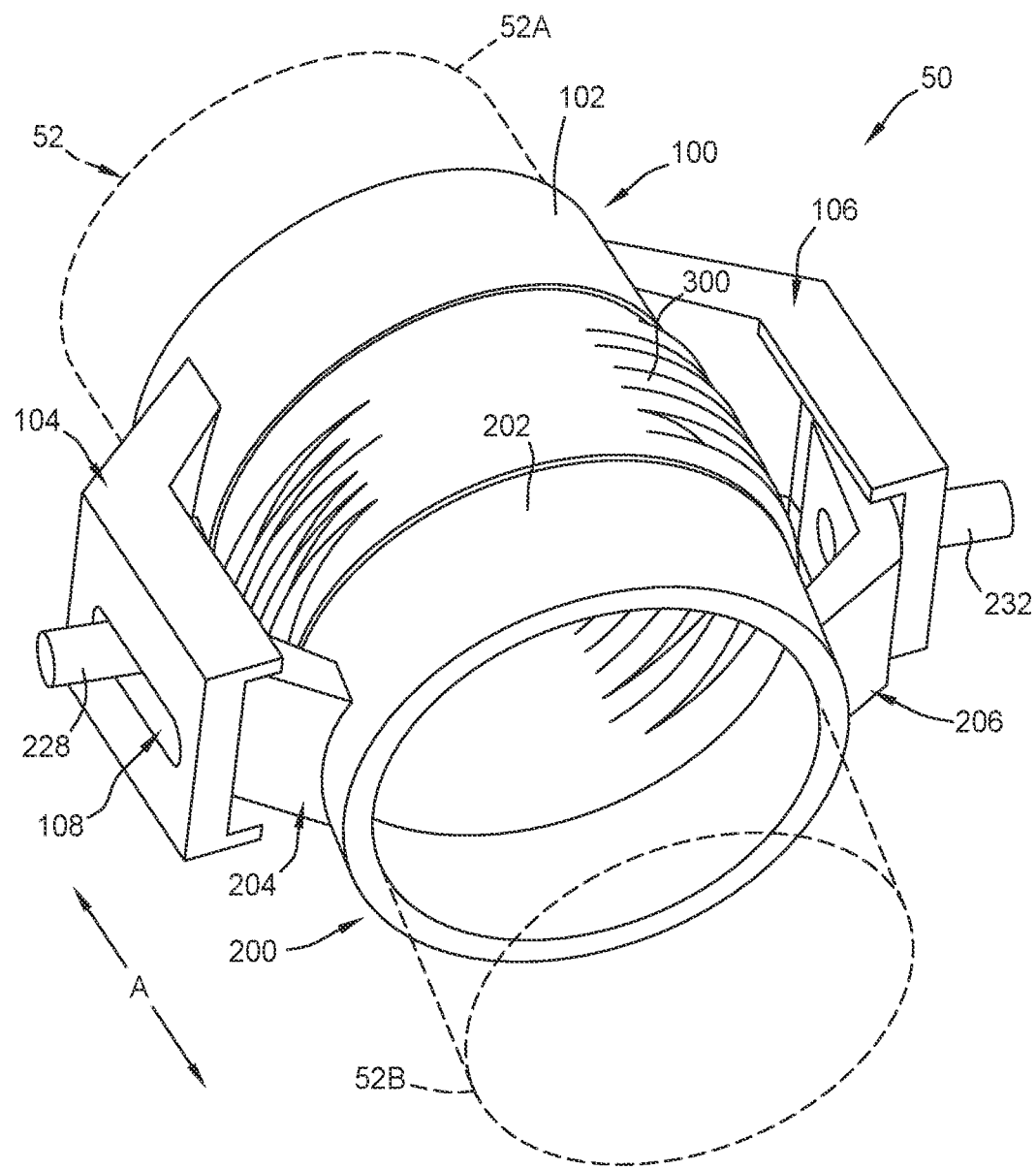
FIG. 1 is a perspective view of a gimbal joint arranged along a feedline in accordance with example aspects of the present disclosure.
Figure 2:
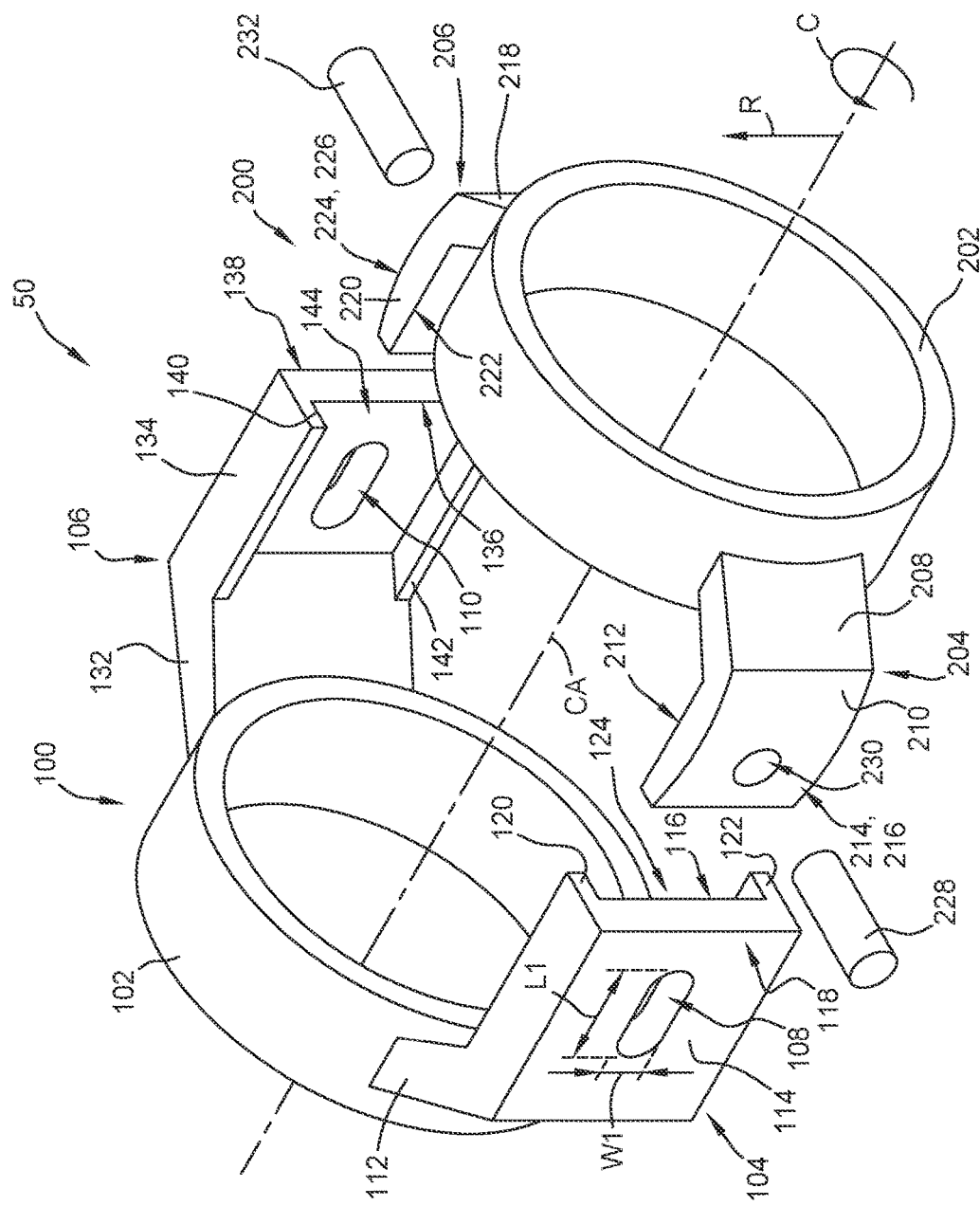
FIGS. 2 and 3 are exploded views of the gimbal joint of FIG. 1.
Figure 3:
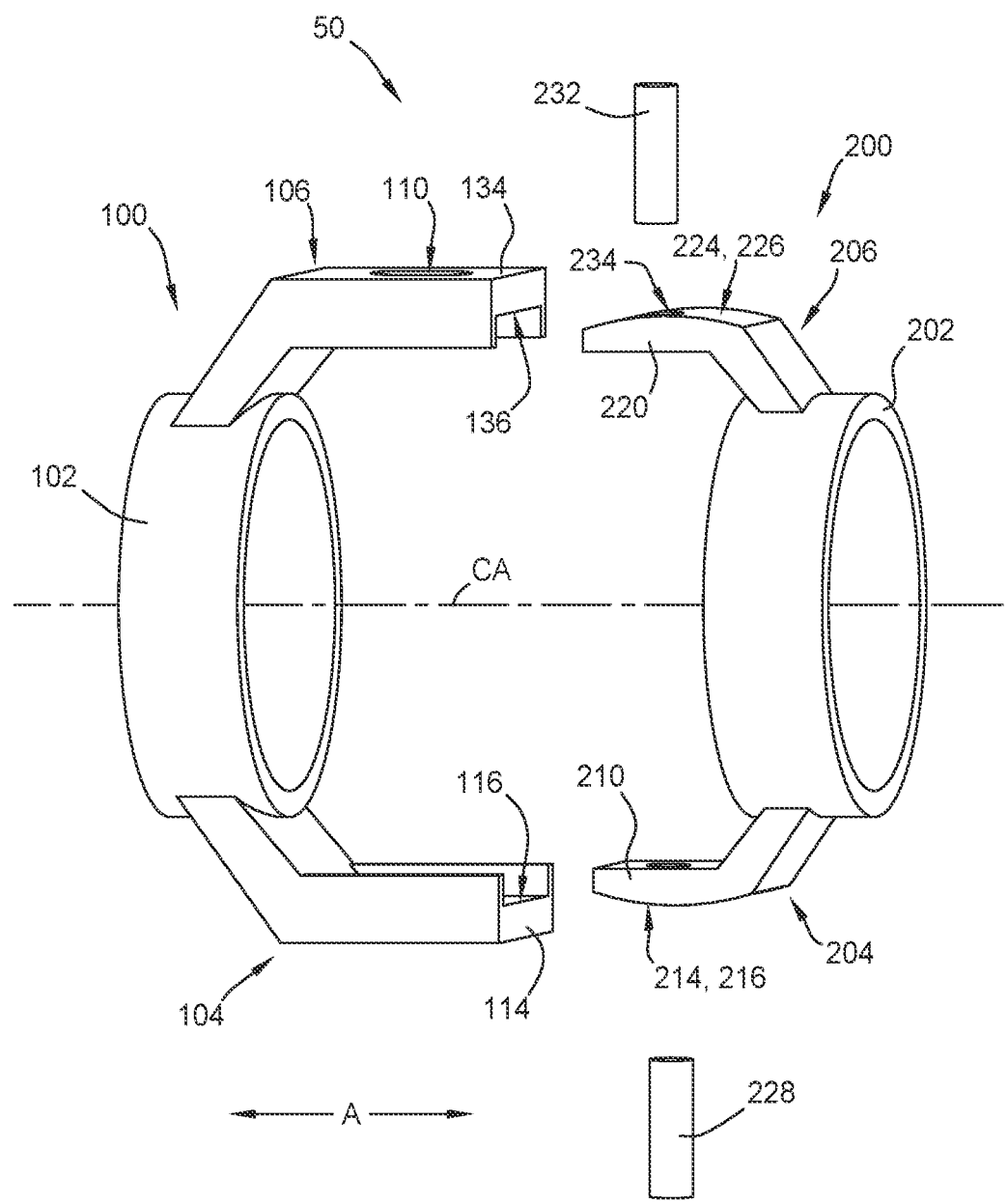

With reference now to FIGS. 1, 2, and 3, a gimbal joint 50 is depicted. FIG. 1 is a perspective view of the gimbal joint 50 and FIGS. 2 and 3 each show exploded views of the gimbal joint 50. For reference, the gimbal joint 50 defines an axial direction A, a radial direction R, and a circumferential direction C. The gimbal joint 50 also defines a central axis CA, which extends along the axial direction A. The circumferential direction C extends around the central axis CA.

As illustrated, the gimbal joint 50 includes a first clevis 100, a second clevis 200, and a bellows 300 (the bellows 300 is shown in FIG. 1 but removed for illustrative purposes in FIGS. 2 and 3). The bellows 300 flexibly couples the first clevis 100 and the second clevis 200. A combination of the first clevis 100, the second clevis 200, and the bellows 300 allows the gimbal joint 50 to function like a scotch yoke to provide angular rotation as well as vibration isolation properties, e.g., along a fuel line for an aircraft engine. The first and second clevises 100, 200 can be formed of a metal material, a plastic material, or another suitable material.

The bellows 300 is generally tubular and defines an open interior volume that allows fluid to pass therethrough. The bellows 300 has a cylindrical shell of corrugated material. The corrugations can define an outer diameter and an inner diameter of the bellows 300 and can allow for angular rotation or flexing of the bellows 300. The corrugated material of the bellows 300 can be metal or any other appropriate material. For example, the bellows 300 can be made of three 14 mil plies of a nickel-chromium super alloy, such as Inconel® 718 or 625. Such a composition can provide the angulation, pressure resistance, temperature tolerance, and corrosion resistance needed for transportation of particular fluids under pressure.

The first clevis 100 has a first rim 102, a first arm 104, and a third arm 106. The first rim 102 has an annular shape and is coupled with one end of the bellows 300. For instance, an end of the bellows 300 can be clamped to the first rim 102. The first rim 102 can also be coupled with a first segment 52A of a conduit 52 (FIG. 1) arranged to carry a fluid, such as fuel. The first and third arms 104, 106 each extend from the first rim 102 and each define slots 108, 110. The first and third arms 104, 106 are arranged radially opposite to one another with respect to the central axis CA of the gimbal joint 50, or stated differently, arranged one hundred eighty degrees (180°) from one another along the circumferential direction C. In some alternative aspects, the first and third arms 104, 106 can be spaced from one another along the circumferential direction C more or less than one hundred eighty degrees (180°).

The first arm 104 of the first clevis 100 has a first extender 112 that angles the first arm 104 radially outward with respect to the central axis CA as well as axially toward the second clevis 200. A first flange 114 is connected to the first extender 112 and forms a distal portion of the first arm 104. The first flange 114 of the first arm 104 defines the slot 108. The slot 108 has a length L1 extending along the axial direction A, a width W1 extending generally along the circumferential direction C, and a depth extending along the radial direction R. In some aspects, the length L1 is at least twice the width W1. In other aspects, the length L1 is at least three times the width W1. In this regard, a long axis of the slot 108 is defined along the axial direction A. The width W1 of the slot 108 is sized to accommodate the diameter of a pin (e.g., a first pin 228).

The first flange 114 has a first inner surface 116 and a first outer surface 118. The first inner surface 116 is radially inward of the first outer surface 118 with respect to the central axis CA. The first inner surface 116 is a planar surface. The first flange 114 also includes opposing tabs 120, 122 that define a recess 124 in which an arm (e.g., a second arm 204) of the second clevis 200 is positioned. The opposing tabs 120, 122 constrain the rotational motion between the first and second clevises 100, 200 to a predetermined range. In some alternative aspects, the first flange 114 does not include the opposing tabs 120, 122.

The third arm 106 of the first clevis 100 is arranged in a similar manner as the first arm 104. Specifically, the third arm 106 has a third extender 132 that angles the third arm 106 radially outward with respect to the central axis CA as well as axially toward the second clevis 200. A third flange 134 is connected to the third extender 132 and forms a distal portion of the third arm 106. The third flange 134 of the third arm 106 defines the slot 110. The slot 110 has a length extending along the axial direction A, a width extending generally along the circumferential direction C, and a depth extending along the radial direction R. In some aspects, the length is at least twice the width. In other aspects, the length is at least three times the width. In this regard, a long axis of the slot 110 is defined along the axial direction A. The width of the slot 110 is sized to accommodate the diameter of a pin (e.g., a second pin 232).

The third flange 134 has a third inner surface 136 and a third outer surface 138. The third inner surface 136 is radially inward of the third outer surface 138 with respect to the central axis CA. The third inner surface 136 is a planar surface. The third flange 134 also includes opposing tabs 140, 142 that define a recess 144 in which an arm (e.g., a fourth arm 206) of the second clevis 200 is positioned. The opposing tabs 140, 142 constrain the rotational motion between the first and second clevises 100, 200 to a predetermined range. In some alternative aspects, the third flange 134 does not include the opposing tabs 140, 142.

The second clevis 200 has a second rim 202, a second arm 204, and a fourth arm 206. The second and fourth arms 204, 206 each extend from the second rim 202. The second rim 202 has an annular shape much like the first rim 102 and is coupled with end of the bellows 300 opposite the end coupled with the first rim 102. The second rim 202 can also be coupled with a second segment 52B of the conduit 52. The second and fourth arms 204, 206 each extend from the second rim 202. The second and fourth arms 204, 206 are arranged radially opposite to one another with respect to the central axis CA of the gimbal joint 50, or stated differently, arranged one hundred eighty degrees (180°) from one another along the circumferential direction C. In some alternative aspects, the second and fourth arms 204, 206 can be spaced from one another along the circumferential direction C more or less than one hundred eighty degrees (180°).

The second arm 204 of the second clevis 200 has a second extender 208 that angles the second arm 204 radially outward with respect to the central axis CA as well as axially toward the first clevis 100. A second flange 210 is connected to the second extender 208 and forms a distal portion of the second arm 204. The second flange 210 of the second arm 204 has a second inner surface 212 and a second outer surface 214. The second inner surface 212 is radially inward of the second outer surface 214 with respect to the central axis CA. The second outer surface 214 is a curved surface 216 that engages the first arm 104 of the first clevis 100, or more particularly, the first inner surface 116 of the first flange 114, so as to allow for rotational motion between the first and second clevises 100, 200. The curved surface 216 of the second arm 204 has convex curvature with respect to the mating surface (e.g., the first inner surface 116) of the first arm 104 that engages the curved surface 216. The curved surface 216 can have a spherical shape, for example.

The fourth arm 206 of the second clevis 200 has a fourth extender 218 that angles the fourth arm 206 radially outward with respect to the central axis CA as well as axially toward the first clevis 100. A fourth flange 220 is connected to the fourth extender 218 and forms a distal portion of the fourth arm 206. The fourth flange 220 of the fourth arm 206 has a fourth inner surface 222 and a fourth outer surface 224. The fourth inner surface 222 is radially inward of the fourth outer surface 224 with respect to the central axis CA. The fourth outer surface 224 is a curved surface 226 that engages the third arm 106 of the first clevis 100, or more particularly the third inner surface 136 of the third flange 134, so as to allow for relative rotational motion between the first and second clevises 100, 200. The curved surface 226 of the fourth arm 206 has convex curvature with respect to the mating surface (e.g., the third inner surface 136) of the third arm 106 that engages the curved surface 226. The curved surface 226 can have a spherical shape, for example.

Accordingly, the second and fourth arms 204, 206 each have curved surfaces 216, 226 that respectively engage the first and third arms 104, 106 of the first clevis 100 so as to allow for relative rotational motion between the first and second clevises 100, 200.

Further, a first pin 228 is coupled or integrally formed with the second arm 204 of the second clevis 200. In some aspects, the first pin 228 can be integrally formed with the second flange 210 of the second arm 204, e.g., as a single monolithic component. In other aspects, the first pin 228 can be coupled with the second arm 204. For instance, the first pin 228 can be received within an opening 230 defined by the second flange 210. The first pin 228 can be press fit into the opening 230, for example. As another example, the first pin 228 can be welded or otherwise attached to the second flange 210. In addition, a second pin 232 is coupled with the fourth arm 206 of the second clevis 200. In some aspects, the second pin 232 can be integrally formed with the fourth flange 220 of the fourth arm 206, e.g., as a single monolithic component. In other aspects, the second pin 232 can be coupled with the second arm 204. For instance, the second pin 232 can be received within an opening 234 defined by the fourth flange 220. The second pin 232 can be press fit into the opening 234, for example. As another example, the second pin 232 can be welded or otherwise attached to the fourth flange 220. The first pin 228 can extend from the curved surface 216 of the second arm 204 and the second pin 232 can extend from the curved surface 226 of the fourth arm 206. The first and second pins 228, 232 can extend from their respective curved surfaces 216, 226 in radially opposite directions, or rather, in opposite directions from the central axis CA.

The first pin 228 and the second pin 232 are slidably received, and consequently slidable, within their respective slots 108, 110. In this regard, the first arm 104 and the second arm 204 form a first slotted pair and the third arm 106 and the fourth arm 206 form a second slotted pair. The first and second slotted pairs are arranged radially opposite to one another with respect to the central axis CA of the gimbal joint 50. The sliding action of the first and second pins 228, 232 within their respective slots 108, 110 allows for relative translational motion between the first clevis 100 and the second clevis 200. The relative translational motion between the first and second clevises 100, 200 advantageously provides the gimbal joint 50 with vibration isolation properties. Particularly, the sliding action of one clevis relative to the other provides vibration damping, which can reduce the propagation of vibrations, e.g., along a fuel line in which the gimbal joint 50 is positioned.

In addition to providing vibration isolation properties, the relative translational motion between the first and second clevises 100, 200 provided by the sliding action of the pins 228, 232 enables angular rotation of the gimbal joint 50; hence, the term "scotch yoke gimbal joint" as translational motion results in angular rotation.

Figure 4:
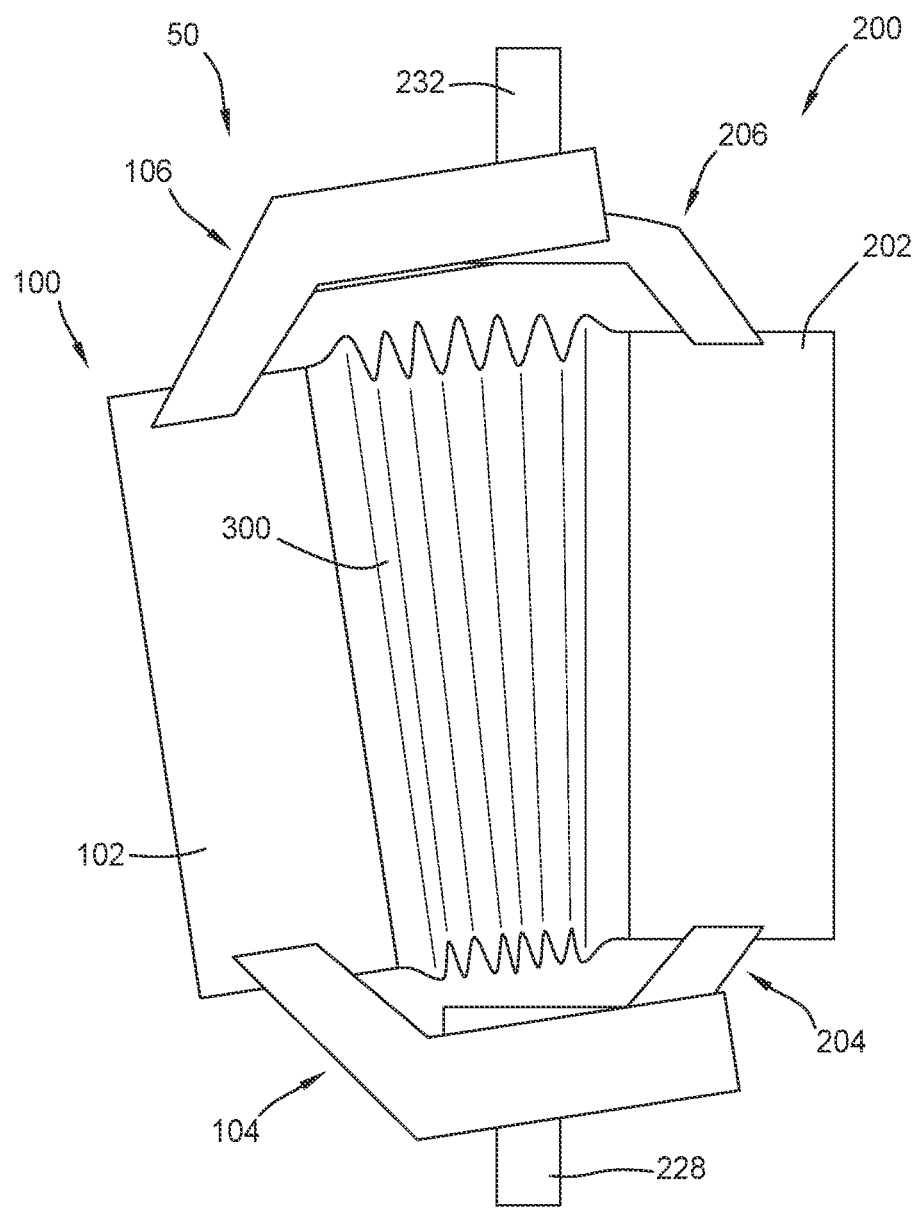
FIG. 4 is a side view of the gimbal joint of FIG. 1 and depicts translational motion thereof.
Figure 5:
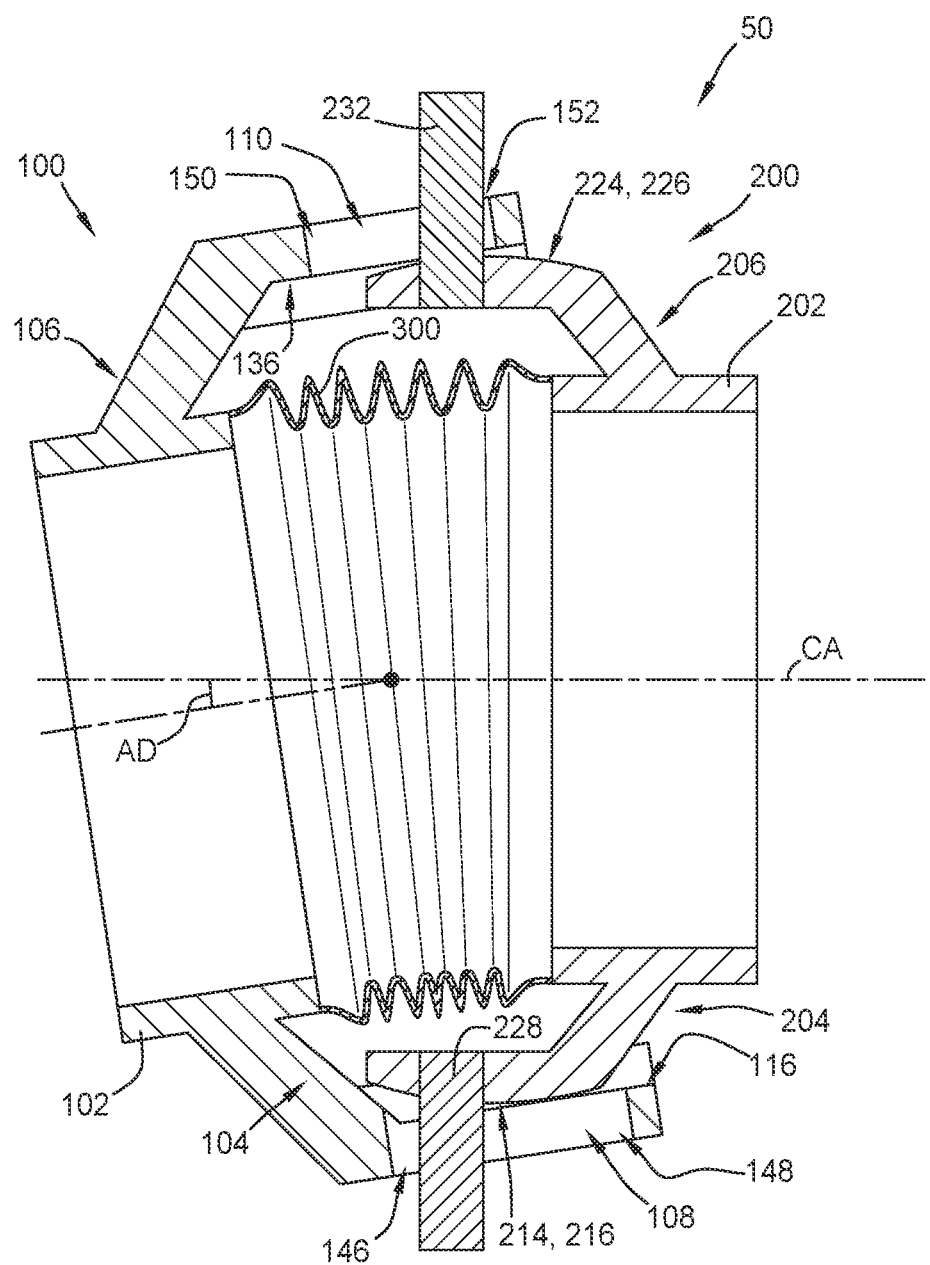
FIG. 5 is a side cross-sectional view of the gimbal joint of FIG. 1 and depicts translational motion thereof.

FIGS. 4 and 5 are views of the gimbal joint 50 undergoing translational motion, and consequently, angular rotation. FIG. 4 is a side view of the gimbal joint 50 and FIG. 5 is a side cross-sectional view of the gimbal joint 50. As depicted, the slot 108 defined by the first flange 114 has a proximal end 146 and a distal end 148, with the proximal end 146 being closer to the first rim 102 than the distal end 148. Likewise, the slot 110 defined by the third flange 134 has a proximal end 150 and a distal end 152, with the proximal end 150 being closer to the first rim 102 than the distal end 152. In FIGS. 4 and 5, the first pin 228 has slid to the proximal end 146 of the slot 108 and the second pin 232 has slid to the distal end 152 of the slot 110. Due to the offset nature of the first and second pins 228, 232 within their respective slots 108, 110 in FIGS. 4 and 5, the first clevis 100 angularly rotates relative to the second clevis 200. Particularly, as shown in FIG. 5, the sliding action of the first and second pins 228, 232 has resulted in an angular deflection of the first clevis 100 with respect to the second clevis 200, which is represented by an angle of angular deflection AD taken with respect to the central axis CA as defined in a neutral state of the gimbal joint 50. The angular deflection of the first clevis 100 relative to the second clevis 200 causes the corrugated material of the bellows 300 near the first slotted pair to contract or compress and the corrugated material of the bellows 300 near the second slotted pair to expand, allowing the gimbal joint 50 to "flex" or angularly rotate.

Generally, the position of the first and second pins 228, 232 within their respective slots 108, 110 can define, at least in part, the angle of angular deflection AD of one clevis relative to the other. The angle of angular deflection AD can also depend, at least in part, on the relative rotational motion between the first clevis 100 and the second clevis 200. Specifically, the first clevis 100 and the second clevis 200 can be rotated relative to one another. The relative rotational motion is facilitated by the curved surfaces 216, 226 of the second and fourth arms 204, 206. The convex profiles of the curved surfaces 216, 226 allow the second and fourth arms 204, 206 to engage the first and third arms 104, 106 but yet still rotate within their respective recesses 124, 144 (FIG. 2).

Figure 6:
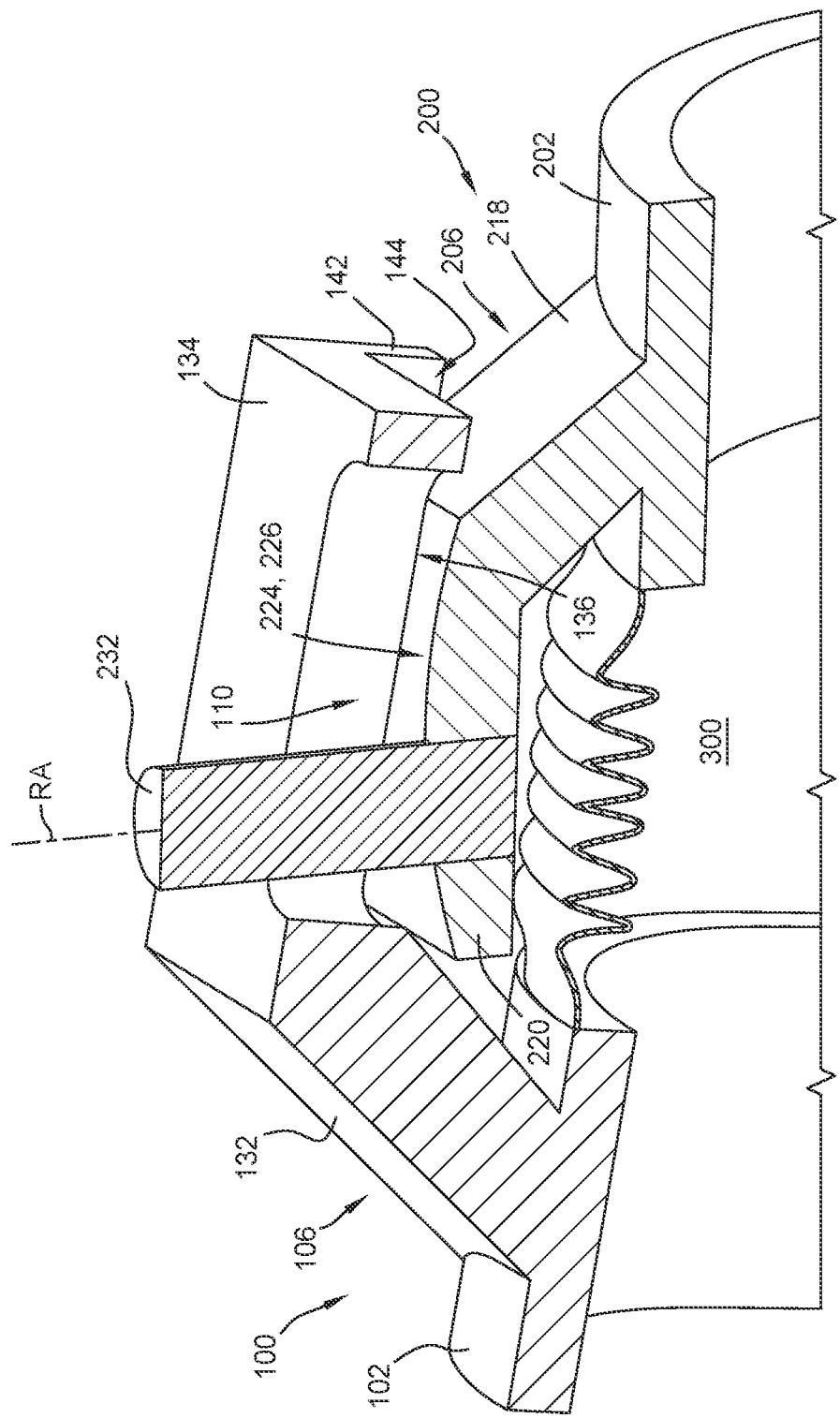
FIG. 6 is a close up, side cross-sectional view of the gimbal joint of FIG. 1 and depicts rotational motion thereof.

With reference now to FIG. 6, FIG. 6 is a perspective cross-sectional view of the gimbal joint 50. As depicted, the fourth flange 220 is received within the recess 144 defined by the third flange 134 and the second pin 232 is slidably received within the slot 110. Also, the fourth outer surface 224, or curved surface 226 of the fourth flange 220, engages the third inner surface 136 of the third flange 134. As the curved surface 226 has a convex profile with respect to the third inner surface 136, which is a planar surface, the curved surface 226 engages the third inner surface 136 as a point contact (for spherical curvature) or with minimal surface area, which minimizes friction therebetween. This allows the fourth flange 220 to swivel or rotate within the recess 144, e.g., about a rotation axis RA, which can have various orientations due to the sliding capability of the first and second clevises 100, 200. The opposing tabs 140, 142 (only tab 142 is depicted in FIG. 6; see FIG. 2) limit the relative rotational motion between the third and fourth flanges 134, 220.

Figure 7:
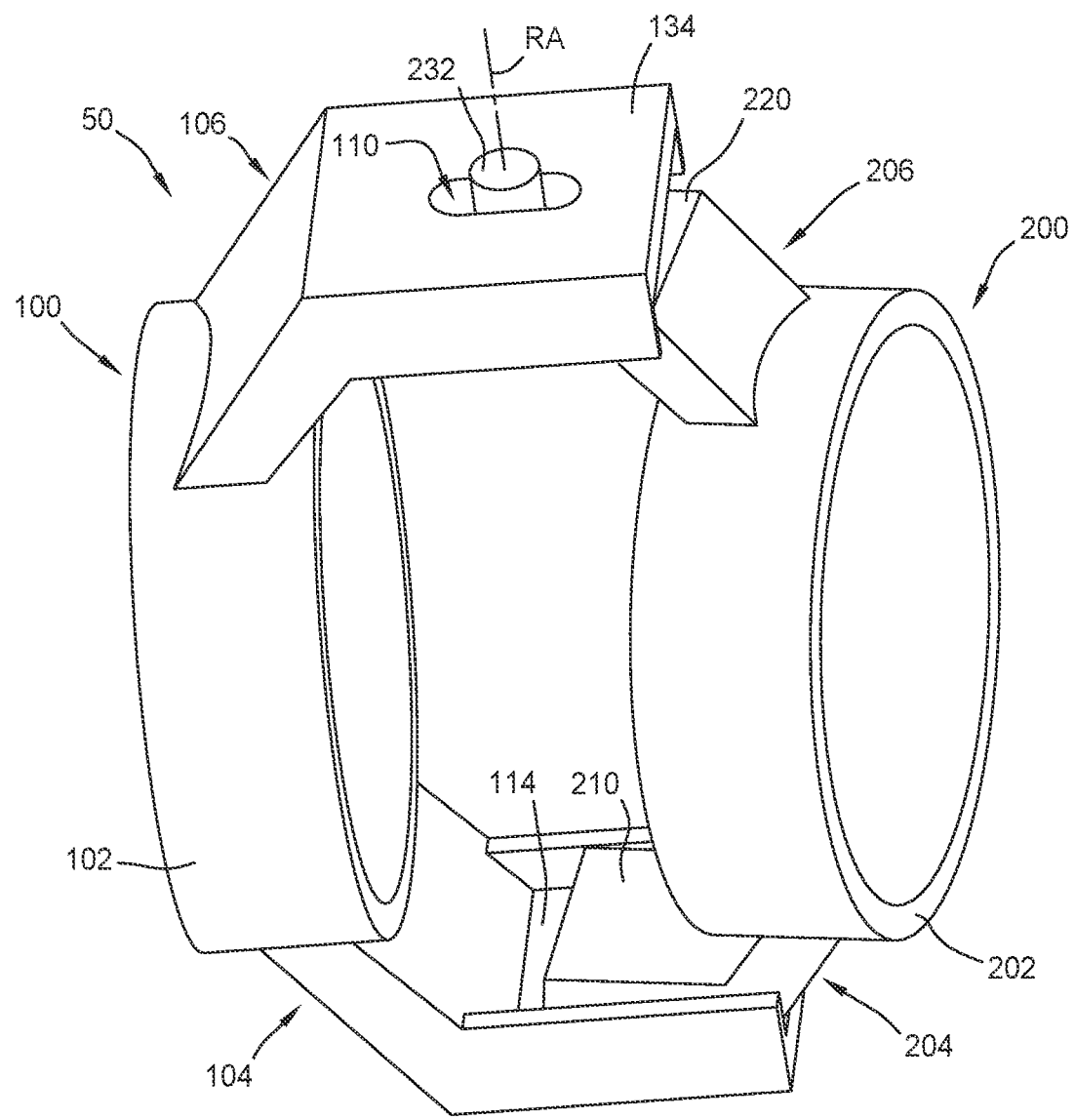
FIG. 7 is a perspective view of the gimbal joint of FIG. 1 and depicts rotational motion thereof.

As shown in FIG. 7, which is a perspective view of the gimbal joint 50, the second flange 210 can swivel or rotate within the recess 124 defined by the first flange 114 in a similar manner as described above with respect to the fourth flange 220 swiveling or rotating within the recess 144 of the third flange 134. The opposing tabs 120, 122 can limit the relative rotational motion between the first and second flanges 114, 210. In FIG. 7, the second clevis 200 is shown rotated about the rotation axis RA toward the viewer of FIG. 7 with respect to the first clevis 100.

To summarize, the ability of the first and second clevises 100, 200 to translate and rotate relative to one another allows for angular movement or rotation of the gimbal joint 50 in any plane, or rather, three hundred sixty degrees (360°) of rotation. Some angular movements of the gimbal joint 50 are achievable by relative translational motion, some are achievable by relative rotational motion, and some are achievable by a combination of relative translational and rotational motion of the first and second clevises 100, 200. The sliding action of the first and second pins 228, 232 within their respective slots 108, 110 provides vibration isolation properties as well as the translational motion. The rotating action facilitated by the curved surfaces 216, 226 provides the rotational motion. The first and second clevises 100, 200 can be translated, rotated, or translated and rotated relative to one another to provide the desired "flex", e.g., along a feedline.

In some alternative aspects, instead of first and third flanges 114, 134 being arranged radially outward of their respective second and fourth flanges 210, 220, e.g., as shown in FIG. 1, the first and third flanges 114, 134 can be arranged radially inward of their respective second and fourth flanges 210, 220. In such alternative aspects, the radially inner surfaces of the second and fourth flanges 210, 220 are curved surfaces that respectively engage the first and third outer surfaces 118, 138 of the first and third flanges 114, 134. In such aspects, the first and second pins 228, 232 can extend from the curved surfaces radially inward toward the central axis CA.

In some further alternative aspects, instead of hard stops or opposing tabs, the rotational motion of the first and second clevises 100, 200 relative to one another can be limited by a spherical profile of the first arm 104 and the third arm 106. For instance, the inner surface of the first flange 114 can have a spherical concave profile relative to a spherical convex profile of the curved surface 216. In this regard, the spherical convex profile of the second flange 210 can rotate with respect to the spherical concave profile of the first flange 114. Likewise, the inner surface of the third flange 134 can have a spherical concave profile relative to a spherical convex profile of the curved surface 226. In this regard, the spherical convex profile of the fourth flange 220 can rotate with respect to the spherical concave profile of the third flange 134. In this regard, the curved surfaces 216, 226 of the second and fourth arms 204, 206 can engage respective spherical profiles of the first and third arms 104, 106 to constrain the rotational motion between the first and second clevises 100, 200 to a predetermined range.

Further, the disclosure includes the following examples:

E1. A gimbal joint, comprising: a first clevis having a first arm defining a slot; a second clevis having a second arm, the second arm has a curved surface that engages the first arm and allows for relative rotational motion between the first and second clevises; and a pin coupled or integrally formed with the second arm and slidably received within the slot of the first arm to allow for relative translational motion between the first and second clevises.

E2. The gimbal joint of E1, wherein the first clevis has a third arm defining a slot and the second clevis has a fourth arm that has a curved surface that engages the third arm to allow for relative rotational motion between the first and second clevises, and wherein the gimbal joint further comprises: a second pin coupled or integrally formed with the fourth arm and slidably received within the slot of the third arm to allow for relative translational motion between the first and second clevises.

E3. The gimbal joint of E2, wherein the first arm and the second arm form a first slotted pair and the third arm and the fourth arm form a second slotted pair, and wherein the first and second slotted pairs are arranged radially opposite one another with respect to a central axis of the gimbal joint.

E4. The gimbal joint of any of E1-E3, wherein the curved surface of the second arm is a radially outer surface of the second arm that engages a radially inner surface of the first arm.

E5. The gimbal joint of claim 4, wherein the radially inner surface of the first arm is a planar surface.

E6. The gimbal joint of any of E1-E5, wherein the curved surface of the second arm is a radially inner surface of the second arm that engages a radially outer surface of the first arm.

E7. The gimbal joint of any of E1-E6, wherein the second arm defines an opening in which the pin is received.

E8. The gimbal joint of any of E1-E7, wherein the first arm includes opposing tabs that define a recess in which the second arm is positioned, the opposing tabs constrain the relative rotational motion between the first and second clevises to a predetermined range.

E9. The gimbal joint of any of E1-E8, wherein the first clevis has a first rim from which the first arm extends, and the second clevis has a second rim from which the second arm extends, and wherein the gimbal further comprises: a bellows that is flexibly coupled with the first rim and the second rim.

E10. The gimbal joint of any of E1-E9, wherein the curved surface of the second arm has convex curvature with respect to a surface of the first arm that engages the curved surface.

E11. The gimbal joint of any of E1-E10, wherein the slot has a length and a width, and wherein the length is at least twice the width.

E12. The gimbal joint of any of E1-E11, wherein the first arm has a first extender and a first flange connected to the first extender, the first extender angles the first arm radially outward with respect to a central axis of the gimbal joint as well as axially toward the second clevis.

E13. The gimbal joint of E12, wherein the first flange defines the slot, and wherein the slot has a long axis that extends axially.

E14. A gimbal joint, comprising: a first clevis having a first rim, a first arm, and a third arm, the first and third arms each extend from the first rim and each define slots; a second clevis having a second rim, a second arm, and a fourth arm, the second and fourth arms each extend from the second rim, the second arm and the fourth arm each have curved surfaces that respectively engage the first arm and the third arm of the first clevis so as to allow for relative rotational motion between the first and second clevises; a bellows coupling the first rim and the second rim; a first pin coupled or integrally formed with the second arm and received within the slot of the first arm; and a second pin coupled or integrally formed with the fourth arm and received within the slot of the third arm, and wherein the first pin and the second pin are slidably received within their respective slots so as to allow for translational motion between the first and second clevises.

E15. The gimbal joint of E14, wherein the first arm has a first extender and a first flange connected to the first extender, the first extender angles the first arm radially outward with respect to a central axis of the gimbal joint as well as axially toward the second clevis, and wherein the third arm has a third extender and a third flange connected to the third extender, the third extender angles the third arm radially outward with respect to the central axis as well as axially toward the second clevis, and wherein the first and third flanges each define one of the slots.

E16. The gimbal joint of E15, wherein the second arm has a second extender and a second flange connected to the second extender, the second extender angles the second arm radially outward with respect to the central axis as well as axially toward the first clevis, and wherein the fourth arm has a fourth extender and a fourth flange connected to the fourth extender, the fourth extender angles the fourth arm radially outward with respect to the central axis as well as axially toward the first clevis, and wherein the second and fourth flanges each include one of the curved surfaces.

E17. The gimbal joint of E15 or E16, wherein the first flange defines one of the slots and the third flange defines one of the slots.

E18. The gimbal joint of any of E14-E16, wherein the first pin extends from the curved surface of the second arm and the second pin extends from the curved surface of the fourth arm.

E19. A feedline, comprising: a conduit for carrying a fluid; and a gimbal joint positioned along the conduit, the gimbal joint comprising: a first clevis having a first rim and a first arm extending from the first rim, the first rim is coupled with a first segment of the conduit and the first arm defines a slot; a second clevis having a second rim and a second arm extending from the second rim, the second rim is coupled with a second segment of the conduit and the second arm has a curved surface that engages the first arm and allows for relative rotational motion between the first and second clevises; a bellows coupling the first rim and the second rim; and a pin coupled or integrally formed with the second arm, the pin is slidably received within the slot of the first arm to allow for relative translational motion between the first and second clevises.

E20. The feedline of E19, wherein the feedline is a fuel line for an aircraft.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Moreover, the terms "first", "second", "third", and "fourth" have been applied to various features herein for ease of identifying and distinguishing the features. Such terms are not intended to signify importance of the named features. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations.

While the foregoing is directed to aspects of the present disclosure, other and further aspects of the disclosure may be devised without departing from the basic scope thereof.

What is claimed is:

1. A gimbal joint, comprising:
a first clevis having a first arm defining a slot, wherein the first arm has a first extender and a first flange connected to the first extender;
a second clevis having a second arm, the second arm has a curved surface that engages the first arm and allows for relative rotational motion between the first and second clevises, wherein the first extender angles the first arm radially outward with respect to a central axis of the gimbal joint as well as axially toward the second clevis;
a first pin coupled or integrally formed with the second arm and slidably received within the slot of the first arm,
wherein the first clevis has a third arm defining a slot and the second clevis has a fourth arm that has a curved surface that engages the third arm; and
a second pin coupled or integrally formed with the fourth arm and slidably received within the slot of the third arm.

2. The gimbal joint of claim 1, wherein the first arm and the second arm form a first slotted pair and the third arm and the fourth arm form a second slotted pair, and wherein the first and second slotted pairs are arranged radially opposite one another with respect to a central axis of the gimbal joint.

3. The gimbal joint of claim 1, wherein the curved surface of the second arm is a radially outer surface of the second arm that engages a radially inner surface of the first arm.

4. The gimbal joint of claim 3, wherein the radially inner surface of the first arm is a planar surface.

5. The gimbal joint of claim 1, wherein the curved surface of the second arm is a radially inner surface of the second arm that engages a radially outer surface of the first arm.

6. The gimbal joint of claim 1, wherein the second arm defines an opening in which the first pin is received.

7. The gimbal joint of claim 1, wherein the first arm includes opposing tabs that define a recess in which the second arm is positioned, and the opposing tabs constrain relative rotational motion between the first and second clevises to a predetermined range.

8. The gimbal joint of claim 1, wherein the first clevis has a first rim from which the first arm extends, and the second clevis has a second rim from which the second arm extends, and wherein the gimbal joint further comprises a bellows that is flexibly coupled with the first rim and the second rim.

9. The gimbal joint of claim 1, wherein the curved surface of the second arm has a convex curvature with respect to a surface of the first arm that engages the curved surface.

10. The gimbal joint of claim 1, wherein the slot has a length and a width, and wherein the length is at least twice the width.

11. The gimbal joint of claim 1, wherein the first flange defines the slot, and wherein the slot has a long axis that extends axially.

12. A gimbal joint, comprising:
a first clevis having a first rim, a first arm, and a third arm, the first and third arms each extend from the first rim and each define slots;
a second clevis having a second rim, a second arm, and a fourth arm, the second and fourth arms each extend from the second rim, the second arm and the fourth arm each have curved surfaces that respectively engage the first arm and the third arm of the first clevis so as to allow for relative rotational motion between the first and second clevises;
a bellows coupling the first rim and the second rim;
a first pin coupled or integrally formed with the second arm and received within the slot of the first arm; and
a second pin coupled or integrally formed with the fourth arm and received within the slot of the third arm, and wherein the first pin and the second pin are slidably received within their respective slots so as to allow for translational motion between the first and second clevises.

13. The gimbal joint of claim 12, wherein the first arm has a first extender and a first flange connected to the first extender, the first extender angles the first arm radially outward with respect to a central axis of the gimbal joint as well as axially toward the second clevis, and wherein the third arm has a third extender and a third flange connected to the third extender, the third extender angles the third arm radially outward with respect to the central axis as well as axially toward the second clevis, and wherein the first and third flanges each define one of the slots.

14. The gimbal joint of claim 13, wherein the second arm has a second extender and a second flange connected to the second extender, the second extender angles the second arm radially outward with respect to the central axis as well as axially toward the first clevis, and wherein the fourth arm has a fourth extender and a fourth flange connected to the fourth extender, the fourth extender angles the fourth arm radially outward with respect to the central axis as well as axially toward the first clevis, and wherein the second and fourth flanges each include one of the curved surfaces.

15. The gimbal joint of claim 13, wherein the first flange defines one of the slots and the third flange defines one of the slots.

16. The gimbal joint of claim 12, wherein the first pin extends from the curved surface of the second arm and the second pin extends from the curved surface of the fourth arm.

17. A feedline, comprising:
a conduit for carrying a fluid; and
a gimbal joint positioned along the conduit, the gimbal joint comprising:
a first clevis having a first rim and a first arm extending from the first rim, wherein the first rim is coupled with a first segment of the conduit and the first arm defines a slot;
a second clevis having a second rim and a second arm extending from the second rim, wherein the second rim is coupled with a second segment of the conduit and the second arm has a curved surface that engages the first arm and allows for relative rotational motion between the first and second clevises;
a bellows coupling the first rim and the second rim; and
a pin coupled or integrally formed with the second arm, wherein the pin is slidably received within the slot of the first arm to allow for relative translational motion between the first and second clevises.

18. The feedline of claim 17, wherein the feedline is a fuel line for an aircraft.

19. A gimbal joint, comprising:
a first clevis having a first arm defining a slot, wherein the first clevis has a first rim from which the first arm extends;
a second clevis having a second arm, wherein the second clevis has a second rim from which the second arm extends, the second arm has a curved surface that engages the first arm, wherein the curved surface of the second arm is a radially outer surface of the second arm that engages a radially inner planar surface of the first arm;
a bellows that is flexibly coupled with the first rim and the second rim; and
a pin slidably received within the slot of the first arm.

20. A gimbal joint, comprising:
a first clevis having a first arm defining a slot, wherein the first arm has a first extender and a first flange connected to the first extender;
a second clevis having a second arm, the second arm has a curved surface that engages the first arm, wherein the first extender angles the first arm radially outward with respect to a central axis of the gimbal joint as well as axially toward the second clevis; and
a pin slidably received within the slot of the first arm,
wherein the first arm includes opposing tabs that define a recess in which the second arm is positioned.

21. A gimbal joint, comprising:
a first clevis having a first arm extending from a first rim, wherein the first arm defines a slot;
a second clevis having a second arm extending from a second rim, the second arm has a curved surface that engages the first arm and allows for relative rotational motion between the first and second clevises;
a pin coupled or integrally formed with the second arm and slidably received within the slot of the first arm to allow for relative translational motion between the first and second clevises; and
a bellows flexibly coupled with the first rim and the second rim.

* * * * *